(No Model.)
O. H. JADWIN.
CABLE TRACTION FOR STREET CARS.
No. 258,425. Patented May 23, 1882.
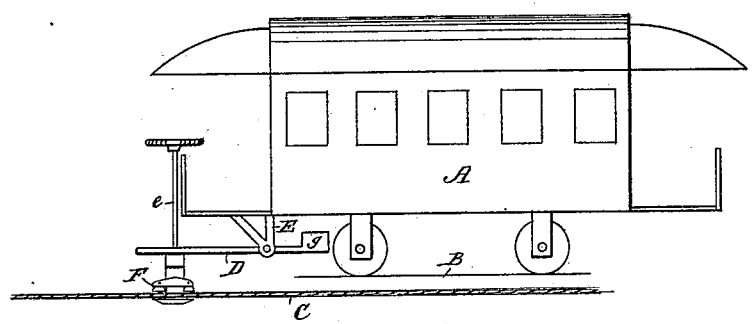
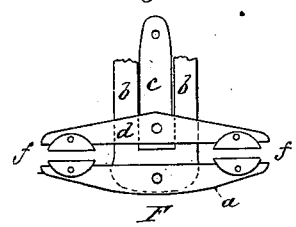
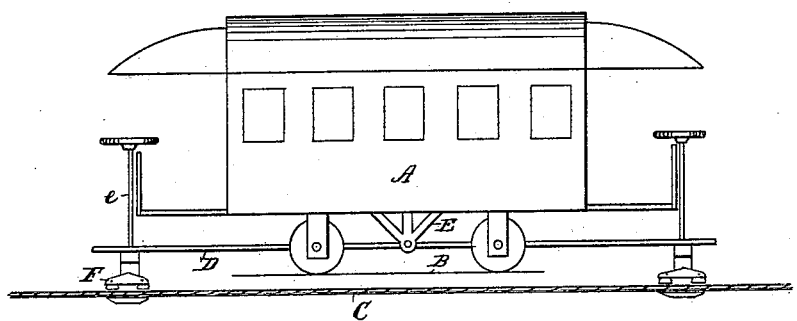
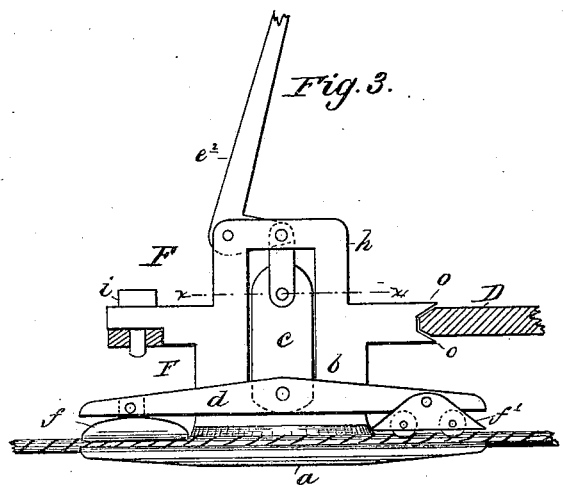
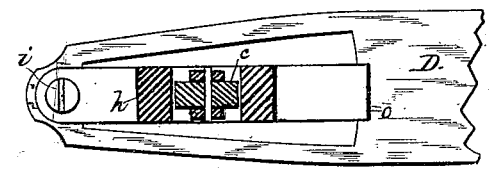
WITNESSES:
W. W. Hollingsworth
Edw. M. Byrn.
INVENTOR:
Orlando H. Jadwin
BY
ATTORNEYS.

UNITED STATES PATENT OFFICE.

ORLANDO H. JADWIN, OF BROOKLYN, NEW YORK.

CABLE-TRACTION FOR STREET-CARS.

SPECIFICATION forming part of Letters Patent No. 258,425, dated May 23, 1882.

Application filed December 19, 1881. (No model.)

*To all whom it may concern:*

Be it known that I, ORLANDO H. JADWIN, of Brooklyn, in the county of Kings and State of New York, have invented certain Improvements in Cable-Traction for Street-Cars; and I do hereby declare that the following is full, clear, and exact description of the same, reference being had to the accompanying drawings, forming part of this specification, in which—

Figure 1 is a side elevation of a car, showing the application of the clutch and means for balancing the same. Fig. 2 is a similar view, showing a modification of the same. Fig. 3 is an enlarged detail of the clutch, with the draw-bar in section. Fig. 4 is a top view, partly in section through line $x\, x$, Fig. 3, showing the connection of the clutch to the draw-bar in front of center of clutch. Fig. 5 is a view showing a modification of my invention, in which both the upper and lower feet or shoes are pivoted to rock in the plane of the cable, and provided with independent rocking sections.

My invention relates to certain improvements in the system of cable-traction for street-cars.

In the Patent No. 236,334, granted me January 4, 1881, I described and claimed a clutch for grasping the traveling cable and connecting the car therewith, in which one or both of the jaws or bearing-faces of the clutch were pivoted so as to rock in the plane of the cable, so as to accommodate irregularities and waves in the cable and make the car to be gradually attached to the same without starting off with a jerk.

One feature of my present invention consists in providing the ends of this rocking section of the clutch with supplemental rocking shoes, which may either bear directly with a sliding friction on the cable or be provided with friction-rollers, the object of the same being to secure level or flat bearing-surfaces at the ends of the rocking clutch-section, to render the clutch more effective, reduce wear, and permit of removal and replacement when worn.

Another feature of my invention consists in balancing the weight of the clutch and draw-bar so as to relieve the cable of the weight, and thereby reduce the wear on the latter.

The invention also consists in hinging or pivoting the grip or clutch to the draw-bar forward of the center of the clutch, so that the clutch may more readily respond to the varying angles of the cable in passing the supporting-pulleys for the cable, all as hereinafter more fully described.

In the drawings, A represents a street-car, B the rails, and C the traveling cable. For connecting the car to the traveling cable, a pull-bar, D, is jointed to a bracket, E, rigidly fixed to the lower part of the car, and is connected at its forward end to the clutch or grip F. This clutch consists of a foot, $a$, (see Fig. 3,) rigidly attached to a slotted shank, $b$, which foot forms one of the main jaws of the clutch, and a rocking shoe, $d$, loosely pivoted to a shank, $c$, which slides in the slot of the shank $b$, and which shoe $d$ forms the other main jaw of the clutch. As described in my previous patent, either one or both of these jaws may be made to rock. By forcing the shank $c$ down its rocking shoe is made to clutch the cable between it and the rigid foot beneath. For thus forcing this shoe down I may use either the screw-threaded shaft $e$ with hand-wheel, as shown in Figs. 1 and 2, or I may use an elbow-lever, $e^2$, as shown in Fig. 3. Upon the ends of the rocking shoe $d$ are arranged supplemental rocking shoes $f f'$, which bear against the cable with a face that is always flat or level with the cable, irrespective of the position of the main shoe $d$. These supplemental shoes may simply have faces formed for a sliding friction, as at $f$, or they may carry friction-rollers, as at $f'$, in which case the axes of each roller are made to bear equally on the cable—a result which it is not possible to obtain when the rollers are located on the main shoe $d$.

In connecting the clutch to the car by a swinging bar or flexible connection, it will be seen that the weight of the clutch and its attachments bears on the cable and involves wearing strain on the same. To the extent of that weight I propose to preserve the flexibility of the connection between the clutch and the car, and still relieve the cable of the weight of this clutch. For this purpose the draw-bar is extended past the bracket to which it is pivoted, and on the other side of this bracket it is provided with a counter-weight, $g$, Fig. 1, which sustains the clutch in equilibrium and relieves the cable of the weight thereof, allowing the clutch to follow the cable in its undulations, and yet relieving it of the wearing strain due to its weight. Instead of using a counterweight for accomplishing this result, I may employ springs; or I may further modify this feature by running the draw-bar the full length of the car and providing it at each end with a clutch and means for applying it to the cable, and then pivoting this long draw-bar in its middle to a bracket under the middle of the car, all as shown in Fig. 2. This arrangement causes one half of the draw-bar and the clutch at one end to balance the other half and other clutch, and permits the car to be connected to the cable at two points, if desired, which enables the car to ascend and descend steep grades with greater safety, and to carry heavy loads without slipping.

For connecting the clutch to the draw-bar a metal frame, $h$, is connected to the slotted shank of the foot, and at its forward end is pivoted to the draw-bar at the point $i$, which is in advance of the center of the clutch, which arrangement allows the clutch to more readily respond to the varying angles of the cable in passing the supporting-pulleys. The frame-piece $h$ oscillates horizontally about its pivot $i$ in a segmental slot cut in the draw-bar, (see Fig. 4,) and is held in place by lips $o$, projecting above and below the draw-bar at the rear of the clutch-frame, so that its rear end may oscillate transversely with respect to the draw-bar without changing its relation thereto as to vertical movement.

Having thus described my invention, what I claim as new is—

1. In a clutch or grip for seizing a traction-rope, the combination of the two main jaws $a$ and $d$, one or both of which are made to rock in the plane of the cable and one or both of which are provided with supplemental bearing-surfaces, also pivoted to rock in the plane of the cable, substantially as shown and described.

2. In a clutch or grip for seizing a traction-rope, the combination of the two main jaws $a$ and $d$, one or both of which are arranged to rock in the plane of the cable and one or both of which are provided with supplemental shoes, also pivoted to rock in the plane of the cable, and bearing friction-rollers, substantially as and for the purpose described.

3. The combination, with the cable, the car, and a clutch having flexible connection with the car, of a counterbalance pull-bar for sustaining the clutch in equilibrium and relieving the cable of its weight.

4. The combination, with a car, of a pull-bar extending the full length of the car and fulcrumed thereto in the middle, and provided at each end with a clutch or grip for connection with the cable, substantially as and for the purpose described.

5. The combination of the clutch and the pull-bar connecting the same with the car, the two being jointed together at a point in advance of the center of the clutch, as described.

6. The combination, with the pull-bar having an opening in its forward end, of the clutch-frame pivoted to the bar at its forward end and arranged to swing in said opening horizontally, as described.

ORLANDO H. JADWIN.

Witnesses:
A. S. VAN BUSKIRK,
J. HAMILTON PLATT.